UNITED STATES PATENT OFFICE.

JOHN W. HYATT, CHARLES S. LOCKWOOD, AND JOHN H. STEVENS, OF NEWARK, NEW JERSEY, ASSIGNORS TO THE BONSILATE COMPANY, OF SAME PLACE.

FACTITIOUS MATERIAL TO IMITATE IVORY, HORN, &c.

SPECIFICATION forming part of Letters Patent No. 236,034, dated December 28, 1880.

Application filed March 1, 1880. (Specimens.)

To all whom it may concern:

Be it known that we, JOHN W. HYATT, CHARLES S. LOCKWOOD, and JOHN H. STEVENS, of Newark, in the county of Essex and State of New Jersey, have invented a new and useful Improvement in Factitious Material to Imitate Ivory, Horn, &c., of which the following specification is a full, clear, and exact description.

The invention has relation to the production of a material having the general appearance and many of the characteristics of ivory, the material itself, as well as the processes by which it is produced, being, we believe, new in the arts.

We have discovered that bone-dust, when subjected to suitable heat and pressure, becomes welded so as to form a solid homogeneous mass, and, further, that by combining therewith appropriate water-repellents the material is rendered impervious to moisture and its character otherwise enhanced.

We have further discovered certain desirable methods of practicing our invention, which are hereinafter described, and which, with the ingredients employed, are in part the subject of this specification.

We describe hereinafter several desirable methods of carrying out our invention, which may be made use of at will, according to the inclination of the operator and the circumstances of the case.

One method which we have practiced with very satisfactory results involves the employment of bone-dust or its equivalent, gums, oils, or other appropriate water-repellents, and an acid. We include within the words "bone-dust or its equivalent" any and every form of dust or powder produced from bone or ivory; but horn, hoof, or other animal substance may be used in connection with the acids and other substances in the processes hereinafter described. Any kind of vegetable gum may be employed; but we recommend shellac or copal, especially the former; and in lieu of a gum, an oil or other water-repellent may be made use of, if preferred. Any acid will produce a result; but we prefer the crystallizable acids, particularly boracic, which possesses marked advantages. It will be seen, therefore, that the materials which we use may be varied within certain general limitations, and that a large variety of substances may be made use of without essentially changing the result.

The form in which the materials are used is a matter of judgment, and may be varied, if desired. It is preferred, however, that they be in a dry, powdered condition when put into the molds.

It being difficult to obtain a satisfactory quality of bone-dust, we manufacture from selected bone a perfectly clean and dry powder, entirely free from grease in any form. It is important that every trace of grease be removed, as its presence, even in very small quantities, may prejudice the result. An excellent powder can be produced by breaking the bone into small pieces and washing it in a tumbling-barrel. One per cent. of carbonate of soda may be added to the water and the barrel actuated for, say, an hour. The solution should then be drawn off and the barrel filled with a fresh admixture of the same character and strength, and again actuated for a period of, say, four or five hours. The bone will then be thoroughly washed to remove the soda, and after being properly dried will be ground in any convenient way.

To serve as the water-repellent we have prepared a solution consisting of four parts of bleached shellac, one part of borax, and sixteen parts of water, the ingredients being thoroughly dissolved by heating the water or otherwise. The water is employed chiefly as a vehicle, as hereinafter explained, so that the proportion given is not essential; but the quantity we specify is convenient and effectuates satisfactorily the objects for which it is used.

The bone-dust and solution of gum, having been thus made ready, are brought together in the proportion of seventeen pounds of bone-dust to twenty-one pounds of the solution of gum and thoroughly mixed. This may be conveniently accomplished by grinding the two together in a paint-mill, or mill of analogous construction, in which case the water performs a useful function as a vehicle in conveying the elements of the solution, so that they are brought directly in contact and united with the particles of dust. If it be desired to color the material, the coloring-matter should be introduced at the time the dust and solution of gum are brought together, and with them subjected to the grinding action of the mill. The color may be applied in the form of either a solution or pigment, according to circumstances. After the bone-dust and solution of gum, in the proportions hereinbefore stated, have been properly united, the admixture is placed in an evaporating-pan and one and one-half pound of boracic acid in the form of crystals added. The complete formula, therefore, will be, of bone-dust, seventeen parts; of the solution of gum, twenty-one parts; of boracic acid, one and one-half part. The effect of the boracic acid will be to precipitate the shellac, to facilitate which the contents of the pan should be constantly stirred until nearly all of the water has disappeared. From the evaporating-pan the material is transferred to a drier of any appropriate construction, where it is carefully treated to free it from the water which remains. In this step it is important that the material be removed from the drier as soon as the separation of the aqueous particles has been fully accomplished. The desiccation of the material having been effected, it may be treated with a small percentage of alcohol to render it more fusible, when it is ready for the mold or die.

The molds or dies are of any convenient construction adapted to the performance of the duty imposed upon them. The material is introduced and subjected to an even continuous pressure of, say, two tons to the square inch, at a temperature of, say, from 250° to 275° Fahrenheit, the pressure being continued for, say, from five to twenty minutes, according to the thickness of the article and other circumstances, the essential consideration being, as hereinbefore stated, the effectual welding of the material.

The method just described may be modified without prejudicing the result by substituting for the aqueous solution of shellac and borax a solution consisting of four parts of bleached shellac and sixteen parts of an aqueous solution of ammonia of a specific gravity of .995.

When the ammoniacal solution is made use of, the acid may be entirely dispensed with, if preferred.

When the bone-dust alone is used it is subjected to the action of the heated dies in any convenient manner.

It has been customary heretofore to solidify pulverized or granulated horn or hoof by subjecting them to pressure in heated dies. Bone-dust has also been combined with collodion and with gums and gum-resins and the compounds pressed in dies heated to a proper temperature, the degree of heat, however, being insufficient to cause the particles of bone to be welded. The patent to Hyatt and Blake, No. 89,582, dated May 4, 1869, describes a process of producing a compact and homogeneous quality of ivory by forming collodion and ivory-dust into a plastic mass and submitting the same to molds which are subjected to heat and pressure. The pressure forces the particles of ivory-dust into a close union without welding them, while the heat causes evaporation; but in no instance, as far as we are aware, has pulverized bone been welded, as distinguished from agglutinated, in heated dies or molds, either alone or in combination with a water-repellent.

If desired, the acid and water-repellent may be dispensed with and the bone-dust molded alone, in which event the bone-dust will be introduced into the molds or dies and treated in the same manner as the composition in which a water-repellent and an acid are employed, as hereinbefore described.

By the term "water-repellent," as herein used, we mean a substance which, when united with the bone-dust and molded, will operate to prevent moisture from injuriously affecting the article.

What we claim as our invention, and desire to secure by Letters Patent, is—

1. A material consisting of bone-dust welded by heat and pressure, substantially as described.

2. A material consisting wholly or in part of bone-dust and a water-repellent welded by heat and pressure, substantially as described.

3. A process of producing the material hereinbefore described, in which bone-dust and a suitable water-repellent are combined and the result welded by heat and pressure, substantially as specified.

4. A process in which bone-dust and a water-repellent are welded by heat and pressure, the welding being facilitated by means of an acid, substantially as described.

5. The process of producing the material hereinbefore described, which consists in combining, in the proportions hereinbefore set forth, bone-dust, a solution of gum, and a crystallizable acid, evaporating the solvents which carry the gum and acid, and subjecting the result to heat and pressure, substantially as set forth.

6. The process hereinbefore described, which consists in combining bone-dust and an ammoniacal solution of gum, evaporating the solvents which carry the gum, and subjecting the result to heat and pressure, substantially as described.

JOHN W. HYATT.
CHAS. S. LOCKWOOD.
JOHN H. STEVENS.

Witnesses:
J. WILLIAM FORCE,
ABRAHAM MANNERS.

Correction of Letters Patent No. 236,034.

It is hereby certified that in Letters Patent No. 236,034, granted December 28, 1880, for an improvement in Factitious Material to imitate Ivory, Horn, &c., upon the application of John W. Hyatt, Charles S. Lockwood and John H. Stevens, of Newark, N. J., to The Bonsilate Company of same place as assignee, the words "same place," indicating the residence of the assignee, were erroneously used and written in line 9 of said Letters Patent, and printed at the head of the Specification attached to and forming a part of said Letters Patent instead of the words "New York;" that the proper corrections have been made in the files and records of the Patent Office, and are hereby made in said Letters Patent.

Signed, countersigned, and sealed this 18th day of February, A. D. 1881.

[SEAL.]

A. BELL,
*Acting Secretary of the Interior.*

Countersigned:
E. M. MARBLE,
*Commissioner of Patents.*